○ — INITIAL AMMONIA ADSORPTION ON OXIDIZED DIAMOND AFTER OUTGASSING AT 240 °C.

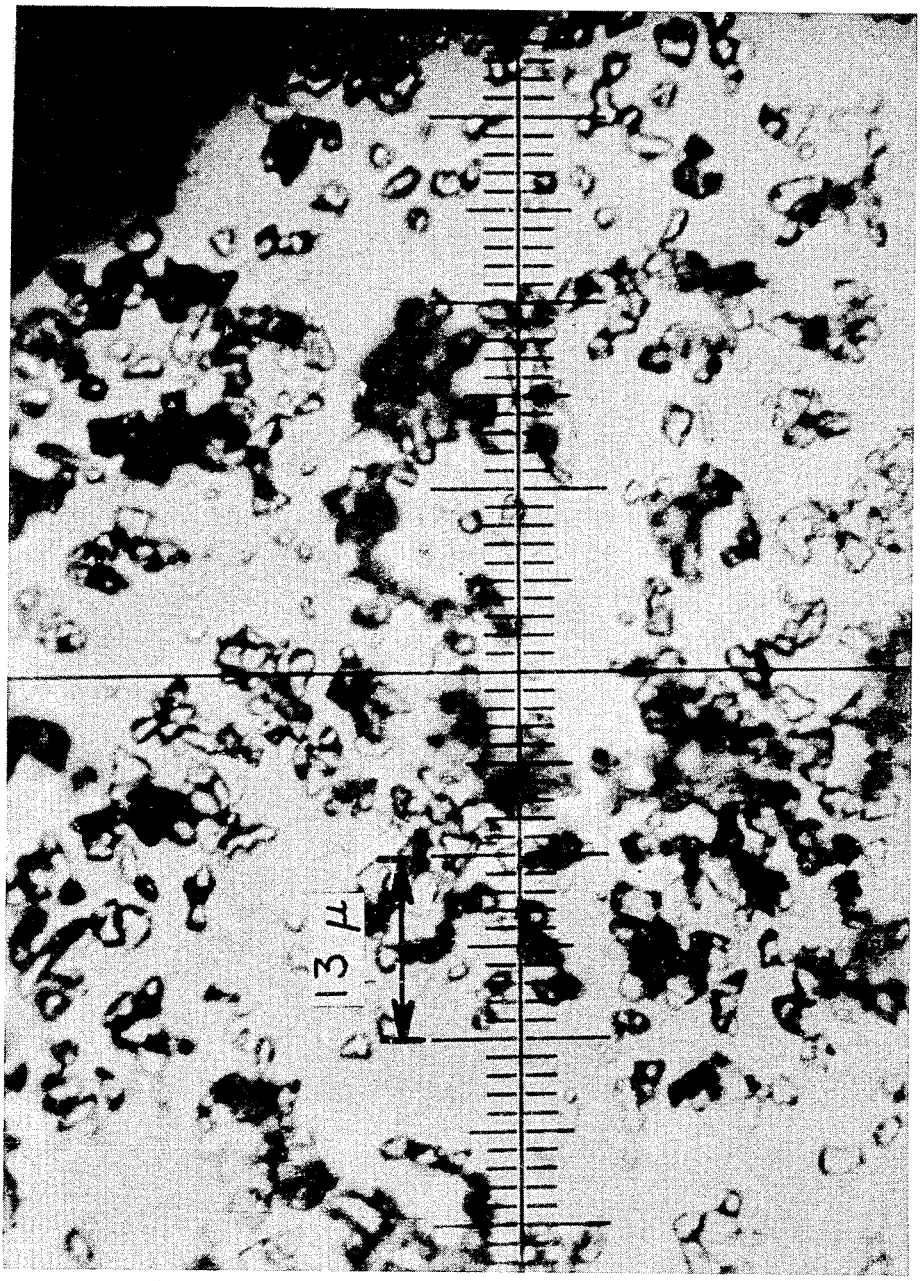

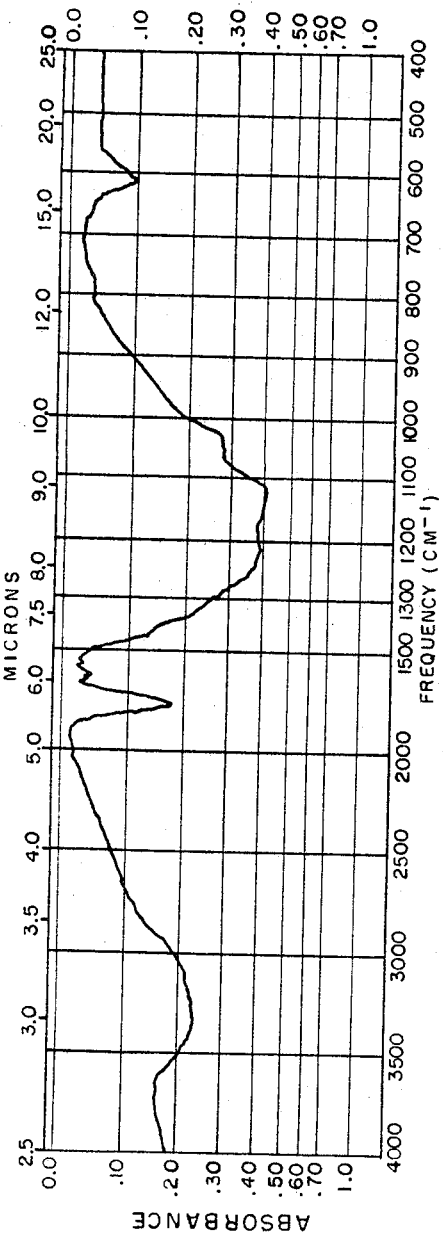
FIGURE 3. ANHYDROUS OXIDIZED DIAMOND
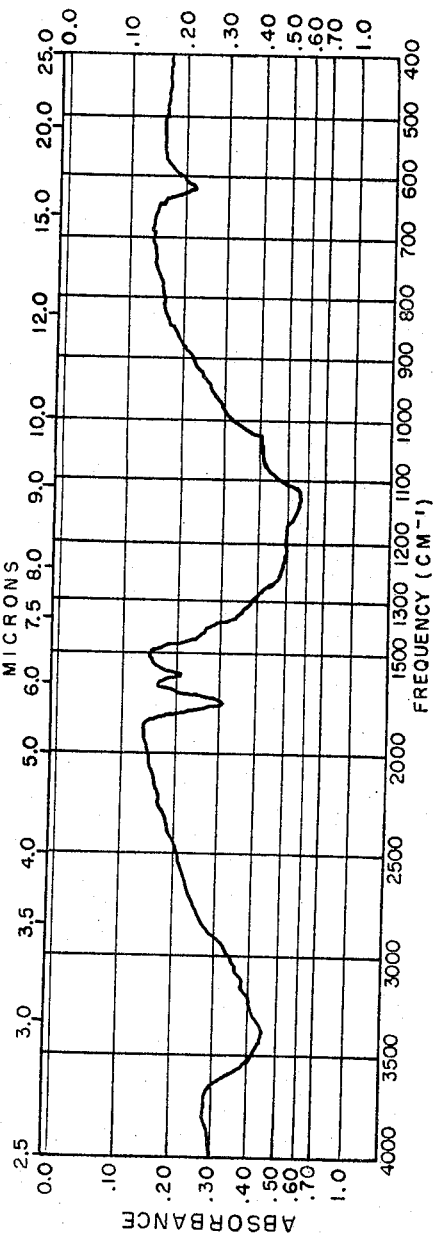
FIGURE 4. OXIDIZED DIAMOND AFTER READSORPTION OF WATER

× — AMMONIA ADSORPTION ON DIAMOND AFTER AMMONIA TREATMENT AND OUTGASSING AT 20 °C.

+ — AMMONIA ADSORPTION AFTER AMMONIA TREATMENT AND OUTGASSING AT 240 °C.

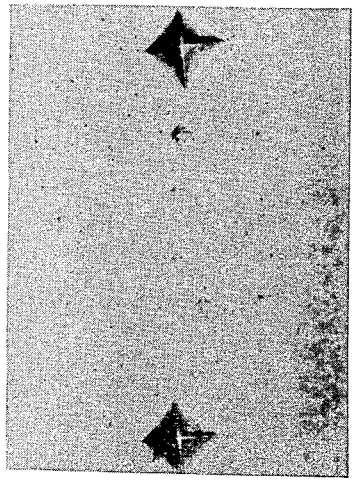
FIGURE 11.  400 X
FIGURE 12.  400 X
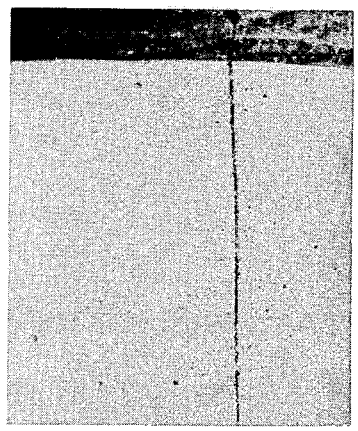
FIGURE 9.  400 X
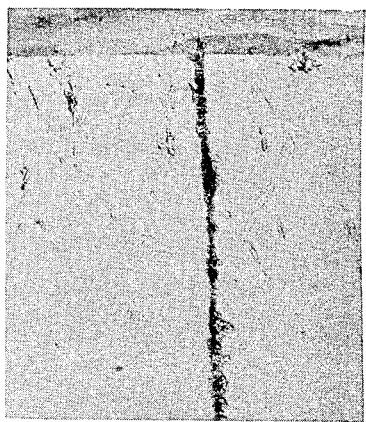
FIGURE 10.  400 X
FIGURE 7.  33 X
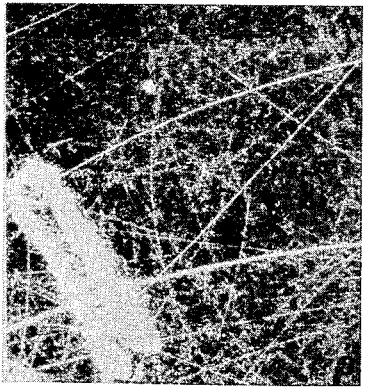
FIGURE 8.  33 X

United States Patent Office 3,422,032
Patented Jan. 14, 1969

3,422,032
SYNTHETIC DIAMANTIFEROUS COMPOSITION
Francis J. Figiel, Boonton, N.J., and Raffaele F. Muraca, Los Altos, Calif., assignors to Allied Chemical Corporation, New York, N.Y., a corporation of New York
Filed Sept. 7, 1965, Ser. No. 485,392
U.S. Cl. 252—444
Int. Cl. C01b 31/06
8 Claims

ABSTRACT OF THE DISCLOSURE

This application is directed to synthetic diamantiferous material composed of individual diamond particles characterized by being free of microscopically detectable crystalline faces, by an average diameter less than about 0.1 micron, by a surface area between about 40 and 400 square meters per gram, and by having at least 10% of their surface area attached to hydroxyl, carboxyl and carbonyl functional groups. The diamantiferous material, when substantially anhydrous, has an infrared spectrogram which has characteristic infrared absorption peaks at the wave lengths 5.65 and 16.2 microns and broad absorption bands at the wave lengths 2.8 to 3.5 microns and 9.2 to 9.8 microns.

---

This invention relates to a novel synthetic diamantiferous material. More particularly, this invention concerns a synthetic diamantiferous material characterized by having a unique particle size and surface structure which characteristics impart thereto outstanding and unusual properties.

Accordingly, one of the principal objects of the present invention is to provide a novel synthetic diamantiferous material having a unique particle size and surface structure.

Another object of the invention is the provision of a novel particulate synthetic diamond exhibiting exceptional load bearing and chromatographic properties.

These and other objects of the present invention will be readily apparent to those skilled in the art from the description which follows.

In the acompanying drawings:

FIGURE 2 is a photomicrograph illustrating the crystal structure of natural diamonds.

FIGURE 3 is an infrared spectrogram of a typical sample of diamantiferous material of this invention when anhydrous.

FIGURE 4 is an infrared spectrogram of the diamantiferous material illustrated in FIGURE 3 when slightly hydrated.

FIGURES 7 through 12 are photomicrographs illustrating hardness properties of the diamantiferous material of the invention.

The diamantiferous material of the present invention is composed of finely-divided individual diamond particles having a hydrophilic surface exhibiting acidic properties. This synthetic diamond material is formed by a method which comprises subjecting "shock loaded graphite," i.e., graphite which has been exposed to shock pressures within the region of diamond stability, to oxidation with nitric acid at a temperature of at least about 280° C. and preferably above about 300° C. at atmospheric pressure. The synthetic diamond particles so produced are then recovered and constitute the novel product of the present invention.

Figure 1:
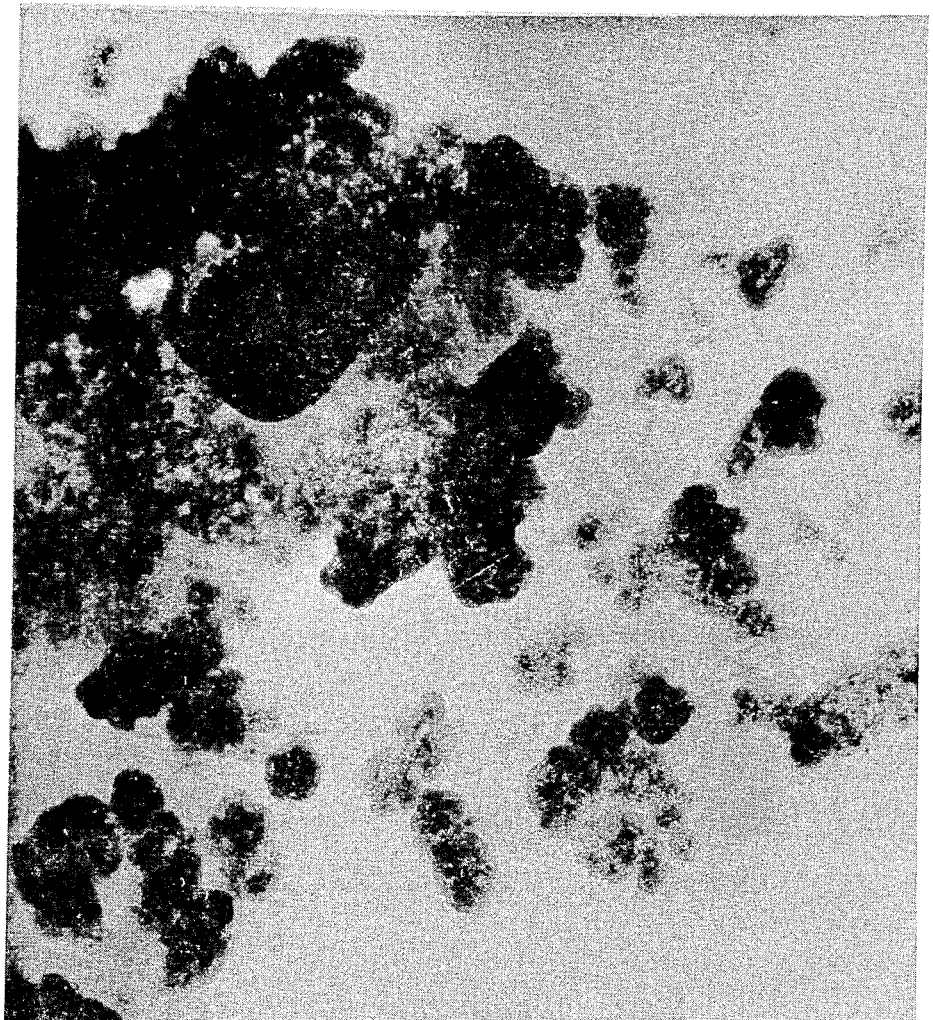
FIGURE 1 is a photomicrograph illustrating the crystal structure of the diamantiferous material of the present invention.

Finely-divided diamond particles of this invention characteristically have a metallic grey luster. Calculation of the average surface area and diameter of these diamond particles from Brunauer-Emmet-Teller isotherms measured on representative diamantiferous materials of the present invention yield a surface area ranging from about 40 to 400 square meters per gram, generally about 100 to 300 square meters per gram and an average diameter not exceeding about 0.1 micron, generally between about $7 \times 10^{-4}$ and $1 \times 10^{-2}$ microns. High resolution electron micrographs (one of which is shown in FIGURE 1) verify that the average particle diameter of our individual diamond particles are within the order specified. In addition, the diamond particles of present concern are free of detectable crystalline faces, even when examined at approximately 100,000 magnification under the electron microscope. Even at these extreme magnifications, microscopic examinations indicate that the diamantiferous material of the present invention is a mass of intertwined diamond crystallites containing so many dislocations that defined crystal planes are not visible. Nevertheless, the existence of sufficiently well-developed diamond crystal lattices has been demonstrated clearly by X-ray diffraction patterns. The absence of defined external crystal planes, which are characteristic of diamonds found in nature and of diamonds produced by other synthetic methods, as described in U.S.P. 2,947,610, for example, are believed to be unique to the diamantiferous material of the present invention.

The surface features of the diamond particles of the present invention may clearly be noted from FIGURE 1, which is a photomicrograph at a magnification of 100,000 times of representative diamond particles of the invention. Aggregates comprised of particles not greater than $1 \times 10^{-2}$ microns in size are visible, corresponding to a particle size of the order of 1000 A. units. The dark structure near the top-left corner of the print is believed to be an agglomerate of particles. This print also shows the amorphous-like rounded surface edges of the diamond particles of this invention; the freedom of any external well-defined crystal planes is readily evident therefrom. In contradistinction, the crystallinity of natural diamonds, having readily discernible sharp-edged fragments, is evident from FIGURE 2, which is a photomicrograph at a magnification of 2300 times of a natural diamond marketed as "2-micron diamond powder" by the Geo-Sciences Instrument Corporation. Furthermore, when the crystal face of natural diamond is etched by oxidation procedures, the indentations which are formed appear as inverted pyramidal defects; the defects visible in FIGURE 1 give no indication of being pyramidal.

In addition to being of a particular finely-divided particle size and having no detectable crystalline faces, the diamantiferous material of the present invention is characterized by having a hydrophilic surface exhibiting acidic properties. As a result of being subjected to the nitric acid oxidation at the required elevated temperatures stated, the surface of the diamond crystallites is identifiably altered. The diamantiferous product obtained from the oxidation process characteristically has at least about 10%, preferably at least about 20%, and generally not more than about 30% of its surface, attached to hydroxyl, carboxyl and carbonyl functional groups, based on the total surface of the diamond particles. In certain instances, depending upon the reaction conditions employed during the oxidation, other oxygen-containing groups such as the products of reaction of these functional groups with each other and the surface atoms of the diamond crystallites, illustratively, anhydride, lactone and ether structures, have been additionally found to be attached to the surface of the diamond crystallites. Infrared spectrograms of our diamantiferous material, when anhydrous, indicate characteristic infrared absorption peaks at the wave lengths 5.65 and 16.2 microns and broad bands of absoprtion at the wave lengths 2.8 to 3.5 microns and 9.2 to 9.8 microns, and when hydrated, characteristic infrared absorption peaks and bands of absorption at the wave lengthe indicated when anhydrous, an additional infrared absorption peak at the wave length 6.1 and more intense absorption in the region approximating 2.9 microns.

Since considerable amounts of oxygen-containing functional groups are attached to the surface of the diamond particles, the carbon content of our diamantifierous material, as determined by microanalytical methods, is appreciatively below the carbon content found in natural diamonds and in man-made diamonds, which are described as being identical to natural diamonds, formed by other synthetic methods. By virtue of the presence of the indicated quantity of oxygen-containing functional groups on the surface of the diamond crystallites, the diamantiferous material of the present invention characteristically has a carbon content between about 80 and 95%, preferably between about 87 and 92%, a hydrogen content between about 0.5 and 1.5%, a nitrogen content between about 0.1 and 2.5% and an ash content not exceeding about 1.0% after being dried in air at a temperature of 200° C. for a period of at least 2 hours for removal of water and other volatile foreign adsorbed materials.

It has been additionally found that the grey diamantiferous material of the present invention, as obtained from the nitric acid oxidation process, unlike most natural diamonds or man-made diamonds manufactured by other synthetic methods, blackens when heated in an argon atmosphere at a temperature in the range from about 850° C. to 900° C. for a period of at least about 4 hours. As a result of this heating, the diamantiferous material loses at least about 5%, generally at least about 8%, of its weight in the form of carbon monoxide, carbon dioxide, water and hydrogen. The darkening effect is ascribed to the removal of relatively gross quantities of surface oxygen-containing functional groups, as a result of which the color of the underlying diamond matrix is exposed. Examination of the blackened material by X-ray crystallographic methods indicates the presence of diffraction patterns characteristic for diamond.

In the U.S. application Ser. No. 313,049 of Paul S. DeCarli, filed Oct. 1, 1963 and now U.S. Patent No. 3,238,019, there are described methods for producing "shock loaded graphite" which serves as the feed material for the nitric acid oxidation process by which the diamantiferous material of the present invention is formed. These methods include forming diamond out of a body made of a carboniferous material having a predetermined average density and surface area by explosively generating a shock pressure pulse extending substantially simultaneously over said surface area with an average amplitude which is a function of said average density to cause a temperature and shock pressure within said body which transfers said carboniferous material to the region of thermodynamic stability for diamond, applying said shock pressure pulse over said surface area of said body, and retaining the product produced by said shock pressure pulse. The disclosure of this DeCarli application is hereby incorporated by reference into the present application.

In general, the crude product resulting from the shock treatment contains less than about 15% diamond, based on the carbon content, and is usually contaminated with gross amounts of unreacted graphite and other inorganic materials. Microscopic examination reveals that the diamond particles are embedded within pockets of unreacted graphite and other contaminants and that the particle size of the product varies from about 30 to about 1000 microns. After removal of inorganic impurities by chemical treatment, the "shock loaded graphite," contaminated with unconverted graphite, as determined by microanalytical methods, characteristically contains at least about 99.0% carbon and not more than about 1.0% hydrogen.

As previously indicated, the diamantiferous product of the present invention is obtained by nitric acid oxidation of "shock loaded graphite." The "shock loaded graphite" starting material normally is contaminated with substantial quantities of unconverted graphite and other inorganic impurities containing silicon, iron, boron, aluminum, calcium and titanium. Preferably, removal of the major portion of the latter-stated inorganic impurities is effected by conventional methods, as by treatment with a mineral acid such as hydrochloric acid and/or an inorganic base such as potassium hydroxide, prior to subjection of "shock loaded graphite" starting material to the oxidation process. To produce a diamantiferous product having the unique crystalline shape, particle size and surface structure above-described, it has been found that, at atmospheric pressure, temperatures of at least about 280° C., and preferably above about 300° C. must be employed. The reaction time, in general, is dependent upon the solids content of the starting material present in the oxidation zone during the reaction and may vary from about 2 to 60 hours, preferably from about 10 to 40 hours for feeds containing about 1 to 30% solids, based on the total weight of the contents present in the oxidation zone. Nitric acid concentrations above about 50% are generally suitable, although at the elevated temperature required, nitric acid concentrations above about 65% are preferred. When operating at atmospheric pressures, the stated elevated temperature may normally be maintained for the required period by employing, as a reaction medium, one or more concentrated mineral acids such as sulfuric or phosphoric acid, salts of mineral acids such as potassium sulfate or mixtures thereof. If desired, superatmospheric pressures up to about 250 atmospheres may be used with correspondingly shorter reaction time. After completion of the oxidation the diamantiferous material of the present invention is recovered by conventional means, as by decantation, and residual acid is washed therefrom with water. Although this product may be used "as is" in chromatographic and bearing applications, it is preferred to remove residual inorganic impurities by methods similar to those employed prior to oxidation, above described, before application for its intended purpose. The diamantiferous material resulting from the afore-described process exhibits a characteristic X-ray diffraction pattern for diamond; is substantially free of graphite, generally containing quantities less than that detectable (about 0.2%) by powder X-ray diffraction methods; and contains less than about 0.2% of inorganic contaminants other than graphite, as determined by emission spectroscopy. In addition, X-ray spectra of the synthetic diamantiferous material of the present invention do not reveal the presence of alumina, silicon carbide or boron carbide.

A specific example illustrative of the preferred practice of the invention follows.

Example 1

A sample of "shock loaded graphite" containing substantial quantities of unreacted graphite and other inorganic contaminants was screened through a 60 mesh screen. 1200 grams of this material which passed through the screen were treated with 1.5 kilograms of 35% HCl at the boiling temperature of the mixture for removal of lime and other inorganic impurities. After effecting the digestion for a period of 3 hours, 492 grams of a solid residue were obtained. To the residue there was added 450 grams of 60% hydrogen fluoride and the resulting mixture was heated to its boiling temperature until all of the hydrogen fluoride added was evaporated. The resulting residue was mixed with 600 grams of potassium hydroxide pellets and the resulting mass was then treated with water to dissolve any soluble constituents present in the mixture. The liquid phase of the mixture was decanted and the residual solids were first washed with water and finally with 30% HI for the removal of residual potassium hydroxide. The recovered solid was then dried at 400° F. for a period of 2 hours. Microanalytical and emission spectrographic analysis of the dried solid indicated a carbon content of 99.2%, a hydrogen content of 0.5%, a silicon content of 0.01%, a calcium content of 0.01% and the presence of trace amounts of magnesium, copper and titanium. The dried solid exhibited X-ray diffraction patterns characteristic for diamond and comparison of these patterns with standardized X-ray patterns containing known amounts of diamond showed that the dried solid residue contained about 12% diamond.

20 grams of the dried solid residue were then added to 500 milliliters of a 10:1 concentrated $H_2SO_4:H_3PO_4$ acid mixture. The resulting mixture was heated to 320° C. at which temperature 1.5 kilograms of 70% nitric acid were added dropwise to the mixture over a period of 2½ hours. After completion of the digestion, the mixture was cooled to room temperature, liquid acid was decanted from the solid and the resulting slurry was washed with water. The dry residue was mixed with 10 grams of potassium hydroxide pellets and then treated with water for dissolution of any soluble constituents present therein. The liquid phase was decanted and the residual solids were washed with water and then with 30% HCl to insure removal of residual potassium hydroxide. After the residue was dried at 200° C. for a period of 2 hours, 2.2 grams of the desired synthetic diamond product were obtained. X-ray diffraction patterns of the product indicated the presence of diamond with no detectable amount of graphite (less than 0.2%). Microanalytical examination of the product showed a carbon content of 87.8%, a hydrogen content of 1.1% and a nitrogen content of 1.94%. Emission spectroscopic examination indicated that less than about 0.2% of inorganic impurities were present. The oxygen content, determined by difference, was about 10.0%.

The infrared spectrum of the oxidized diamond product, shown in FIGURE 3 was measured by standard potassium bromide pellet methods, after heating the sample to 300° C. for a period of 2 hours to remove any adsorbed water. As is evident therefrom, the anyhydrous diamond has characteristic absorption peaks at the wave lengths 5.65 and 16.2 and broad bands of absorption at the wave lengths 2.8 to 3.5 and 9.2 to 9.8 microns. Hydroscopic properties of the oxidized diamond were observed from FIGURE 4, which is the infrared spectrum of the identical salt plate used in obtaining the spectogram illustrated in FIGURE 3, after being permitted to stand at about 25° C. and 70% relative humidity for a period of about 10 hours. As is readily observed therefrom, an additional absorption peak at the wave length 6.1 and more intense absorption in the region approximating 2.9 microns, believed to be attributable to adsorbed water, now appear in the spectrogram of the slightly hydrated diamond. In obtaining the spectrograms shown in FIGURES 3 and 4, pellet mixtures of diamond and potassium bromide, having a ratio of 0.0327 gram of diamond per gram of potassium bromide were employed.

Figure 5:
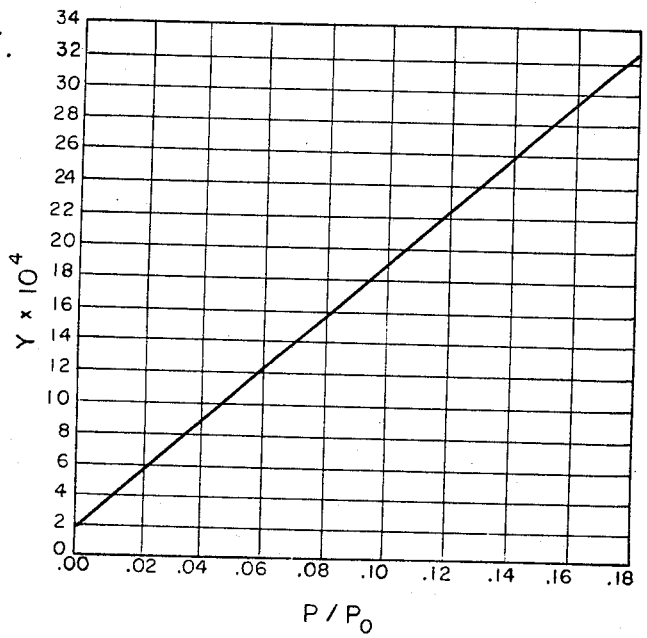
FIGURE 5 is a Brunauer-Emmet-Teller isotherm of argon adsorption on a typical sample of diamantiferous material of this invention.

The surface area of the oxidized diamond particles, obtained from Example 1 above, was determined to be 220 square meters per gram as calculated from a Brunauer-Emmet-Teller isotherm representing argon adsorption on the diamond sample at 78° K., illustrated in FIGURE 5. A plot of the left side of the Brunauer-Emmet-Teller equation, normally written in the form.

$$\frac{x}{V(1-x)} = \frac{1}{V_mC} + \frac{(C-1)x}{V_mC}$$

wherein $x$ is a relative pressure $P/P_0$, and P is the pressure at each isotherm point and $P_0$ is the measured vapor pressure of bulk argon at the isotherm temperature; V is the volume of argon gas adsorbed on the diamond surface; C is a constant, determined in the instant example to be 85.2; and $V_m$ is the volume of argon gas needed to form a unimolecular layer on the surface of the test material, against $x$ affords a means of ascertaining whether or not the adsorption data obeys such an equation and also of evaluating $V_m$, the volume of gas needed to form a monolayer on the test material surface. From the plot illustrated in FIGURE 5, wherein Y is the function $x/V(1-X)$, $V_m$ was determined to be 58.7 cubic centimeters per gram. Using an atomic area of 14 A.$^2$ for the argon atom, the specific surface becomes 220 square meters per gram.

The average diameter of the individual diamond particles, obtained from Example 1, was determined to be 85 A. per particle. This result was calculated from the equation:

$$\frac{A}{V} = \frac{(N)4r^2}{(N)4/3r^3}$$

wherein A, the surface of the sample is 220 square meters per gram; V, the volume of 1 gram of diamond sample, is the reciprocal of the diamond density (3.51 grams per cubic centimeter), N is the total number of particles contained in one gram of diamond sample and $r$ is the diamond particle radius.

The nature and the quantity of the oxygen-containing functional groups chemisorbed or chemically combined on the diamond surface of the diamond particles was determined by reaction of a sample of diamond, obtained from Example 1, with potassium metal and from gas adsorption data of ammonia at 0° C.

To determine the quantity of hydroxyl, carboxyl and carbonyl groups present on the surface, 1 gram of diamond was reacted with potassium metal by distilling an excess of potassium into a sample of the diamond over a high vacuum. After heating the sample for one hour at 250° C., the excess potassium was distilled off of the diamond at temperatures below about 400° C. Distillation of the potassium was considered to be complete when a metallic mirror no longer formed above the diamond particles. At the conclusion of the run, after the diamond samples were sealed off from the vacuum apparatus, a portion of the potassium treated diamond was weighed, suspended in distilled water and the resulting solution was titrated with aqueous 0.1 N HCl. The results showed that 1.58 millimoles of potassium reacted with the surface of 1 gram of diamond which indicates that about 22% of the diamond surface was covered with hydroxyl, carboxyl and carbonyl functional groups.

Figure 6:
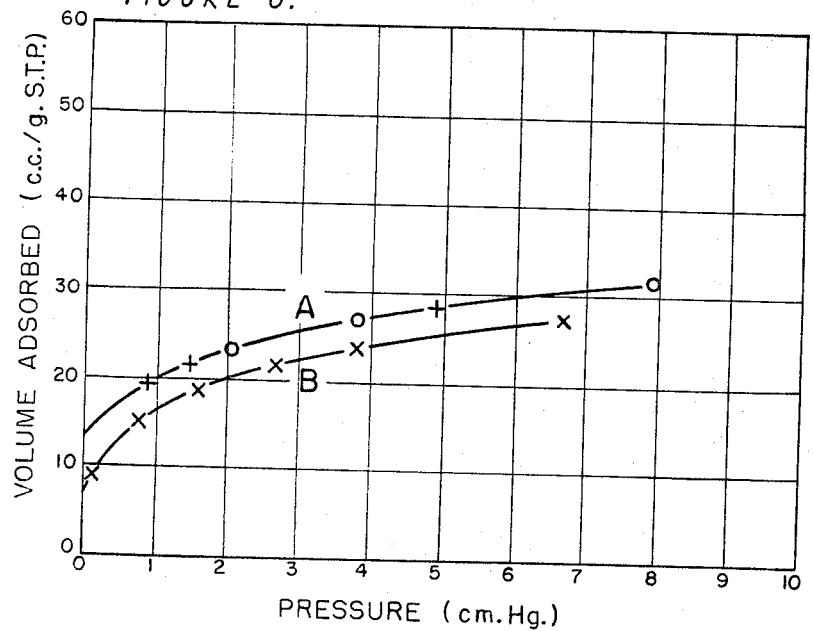
FIGURE 6 illustrates ammonia adsorption isotherms on a typical diamond sample of the present invention.

To determine the fraction of the surface covered with carboxyl groups, ammonia isotherms, illustrated in FIGURE 6, were measured on samples of the oxidized diamond, obtained from Example 1, which has been outgassed overnight at 240° C. at pressures below about $10^{-4}$ mm. Hg. As may be seen therefrom, the ammonia isotherms closely follow the "volume adsorbed" axis at low pressures, which is characteristic of both strong physical adsorption and chemisorption. To measure the amount of chemisorption, the isotherm labelled A was first measured at 0° C. on outgassed diamond. Sample diamond was then outgassed overnight at room temperature to remove only the physically adsorbed ammonia and the ammonia isotherm labelled B was then measured at 0° C. The difference in volume adsorbed between the parallel curves A and B at equal pressure are considered to be the amount of chemisorbed ammonia present on the surface as $NH_4^+$ groups. By this procedure, the amount of chemisorbed ammonia was determined to be 0.14 millimole per gram of diamond sample which indicates that about 2% of the diamond surface was covered with carboxyl functional groups. A third ammonia isotherm, measured at 0° C., after the diamond had been outgassed overnight at 240° C., is shown by the circular points which lie identically on top of curve A. This isotherm demonstrates that the acidic surface sites were not destroyed by heating to temperatures of about 240° C.

The hardness of the diamantiferous material of the present invention was determined by abrading polished synthetic sapphire, polished tungsten carbide and polished natural diamond faces with the product obtained from Example 1 above. Since the hardness of these materials is nine or higher on the Mohs scale and X-ray diffractograms of dissipating the heat evolved during rotation of the test pin. Time, temperature, load and torque are recorded during the test and, at regular intervals, the load on the rotating test Falex pin is increased. A short "run-in" period of minimal loading usually precedes the heavier loads. The test was continued until failure of the coated Falex pin occurred. The results of the test are recorded in Table I below.

TABLE I

| Test surface applied to falex pin | Plating conditions used to apply test surface to falex pin | | | | Wear qualities and lubricity at failure | | |
|---|---|---|---|---|---|---|---|
| | Current (amps.) | Time (min.) | Temperature (° F.) | Weight of plate (grams) | Load (lbs.) | Torque (in. lbs.) | Coefficient of friction |
| Chromium-diamond | 10 | 30 | 130 | 0.1184 | 2600 | 62 | [1] 0.071 |
| Bronze-diamond | 0.1 | 80 | 70 | 0.0680 | 1700 | 42 | [2] 0.0735 |
| Chromium | 10 | 30 | 130 | 0.1422 | 1600 | 64 | [1] 0.1188 |
| Bronze | 0.1 | 80 | 70 | 0.1424 | 550 | 25 | [2] 0.135 |

[1] Break-in time was 5 minutes with no recorded load on the test pin. The test was then run for 5 minutes with 250 pounds of load on the test pin; thereafter, the load was raised by 50 pounds at the end of every minute until the end of the test.

[2] Break-in time was 5 minutes with no recorded load on the test pin. The test was then run for 5 minutes with 250 pounds of load on the test pin; thereafter, the load was raised 50 pounds every 5 minutes up to 55 minutes. The time interval was then changed to 2 minutes for the next 50 pound load increment, 3 minutes for the next increment and 2 minutes thereafter up to 66 minutes. After this time, the load was raised 50 pounds every minute until the end of the test.

of the diamond product did not reveal the presence of any hard material, such as alumina, silicon carbide or boron carbide, it is concluded that the synthetic diamantiferous material of the invention also possesses a hardness of ten on the Mohs scale.

Visual evidence of the hardness of our diamantiferous material may be observed from FIGURES 7 through 12 which are photomicrographs of polished surfaces of substances having Mohs hardness of nine or ten before and after abrasion with the diamantiferous material of the present invention.

FIGURES 7 and 8 are photomicrographs at magnifications of 33 times of the surface of a synthetic sapphire plate. The features visible in FIGURE 7 are scratches made with a diamond-pointed tool; these scratches were used for locating the same area in subsequent microscopic examinations. The abraded surface of the sapphire plate is plainly visible from FIGURE 8 after a small amount of our synthetic diamantiferous material was placed on the plate and rubbed into its surface.

FIGURES 9 and 10 are photomicrographs at magnifications of 400 times of a polished natural diamond face. The characteristic cleavage line of the natural diamond through the center of FIGURE 9 may be readily noted. The abraded surface of the natural diamond is evidenced from FIGURE 10 after our synthetic diamantiferous material was placed on the natural diamond face and pressure applied thereto by the fingers via an intermediate glass plate. This proves that the diamantiferous material of the present invention possesses a Mohs hardness of ten.

FIGURES 11 and 12 are photomicrographs at magnifications of 400 times of a polished tungsten carbide face. The two indentations visible in FIGURE 11 are fiducial points made with a diamond tool under pressure. The abraded surface of the tungsten carbide face is readily apparent from FIGURE 12 after rubbing with a sample of our synthetic diamantiferous material.

As indicated above, the synthetic diamantiferous material of the present invention exhibits improved load bearing and chromatographic properties.

To evaluate the load bearing properties of the synthetic diamond of the present invention, Falex tests were carried out using the diamond obtained from Example 1 above. In this test, metal and metal-diamond coated cylindrical pins were rotated between two steel lever arms by applying a compressive load on the test pin. This load and the resulting torque are measured by suitable gauges mounted on the instrument. The test was carried out in heavy mineral oil, having a Saybolt viscosity of 360 to 390 units at 100° F.; the oil is used for purposes In each of the above tests, the diamond-metal coating proved capable of carrying a greater bearing load than the metal coating alone. In addition, the diamond-metal coating exhibited a lower coefficient of friction at the higher bearing loads than the metal coating alone. The combination of these two properties is desirable for any bearing surface where sliding friction is encountered and indicates that the diamond-metal composite is superior to non-diamond metal bearing surfaces.

To demonstrate the chromatographic properties of the synthetic diamonds of the present invention, a mixture of air, carbon tetrafluoride, tetrafluoroethylene, 1,1-difluoroethylene and difluoromethane was injected into an F & M Model 500 Gas Chromatograph equipped with an eight foot length copper column (¼″ O.D.) filled with the diamond obtained from Example 1 above. The mixture was separated into its individual components after a period of about 20 minutes, using helium as a carrier gas, the temperature of the column and the current of the detector block being maintained at 68° F. and 150 milliamps., respectively. Observed relative retention times are listed in Table II below.

Table II

| Component: | Relative retention time |
|---|---|
| Air | 0.00 |
| $CF_4$ | 0.09 |
| $CF_2{=}CF_2$ | 0.38 |
| $CH_2{=}CF_2$ | 0.61 |
| $CH_2F_2$ | 1.34 |

It is evident from the above results that the synthetic diamantiferous material of the present invention exhibits useful chromatographic properties.

We claim:

1. A synthetic diamantiferous material composed of individual diamond particles having an average diameter not exceeding about 0.1 micron and a surface area between about 40 and 400 square meters per gram, at least 10% of said surface area being attached to hydroxyl, carboxyl and carbonyl functional groups, said diamond particles being characterized by being free of microscopically detectable crystalline faces.

2. The composition of claim 1 having, when substantially anhydrous, an infrared spectrogram which has characteristic infrared absorption peaks at the wave lengths 5.65 and 16.2 microns and broad absorption bands at the wave lengths 2.8 to 3.5 microns and 9.2 to 9.8 microns.

3. The composition of claim 1 characterized by containing less than about 0.2% inorganic contaminants.

4. The composition of claim 3 characterized by being substantially free of graphite.

5. The composition of claim 1 having, after being dried at a temperature of about 200° C. for a period of 2 hours, a carbon content between about 80 and 95%, a hydrogen content between about 0.2 and 2.0%, a nitrogen content between about 0.1 and 2.5% and an ash content not exceeding about 1.0%.

6. The composition of claim 5 exhibiting, when heated in an argon atmosphere at a temperature in the range from 850° C. to 900° C. for a period of about 4 hours, a loss of at least about 5% of its weight in the form of carbon monoxide, carbon dioxide, water and hydrogen.

7. A gray synthetic diamantiferous material composed of individual diamond particles having an average diameter between about $7 \times 10^{-4}$ and $1 \times 10^{-2}$ micron and a surface area between about 100 and 300 square meters per gram, at least 20% of said surface area being attached to hydroxyl, carboxyl and carbonyl functional groups, said diamond particles being characterized by being free of defined external crystal planes detectable by optical microscopic examination.

8. The composition of claim 7 being further characterized by: (1) having, when substantially anhydrous, an infrared spectrogram which has characteristic infrared absorption peaks at the wave lengths 5.65 and 16.2 microns and broad absorption bands at the wave lengths 2.8 to 3.5 microns and 9.2 to 9.8 microns; (2) containing less than about 0.2% inorganic contaminants; (3) being substantially free of graphite and (4) having, after being dried at a temperature of about 200° C. for a period of 2 hours, a carbon content between about 87 and 92%, a hydrogen content between about 0.2 and 2.0%, a nitrogen content between about 0.1 and 2.5% and an ash content not exceeding about 1.0%.

References Cited

UNITED STATES PATENTS

| | | | |
|---|---|---|---|
| 2,947,610 | 8/1960 | Hall et al. | 23—209.1 |
| 3,030,188 | 4/1962 | Eversole | 23—209.1 |
| 3,238,019 | 3/1966 | De Carli | 23—209.1 |

FOREIGN PATENTS

| | | |
|---|---|---|
| 838,035 | 6/1960 | Great Britain. |

OTHER REFERENCES

Parsons "Philosophical Transactions of The Royal Society" vol. 220, 1919, pp. 67, 79, and 80.

Omar et al.: "Chemical Abstracts" 48, 1954, col. 13309–13310.

EDWARD J. MEROS, Primary Examiner.

U.S. Cl. X.R.

23—209.2; 252—445, 12, 29; 55—67